United States Patent
Kuo et al.

(10) Patent No.: US 12,495,416 B2
(45) Date of Patent: Dec. 9, 2025

(54) DUTY-CYCLE BASED CONFIGURED SCHEDULING

(71) Applicant: Nokia Technologies Oy, Espoo (FI)

(72) Inventors: Ping-Heng Kuo, London (GB); Petteri Kela, Kaarina (FI); Guillermo Pocovi, Aalborg (DK); Zexian Li, Espoo (FI); Dawid Koziol, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 388 days.

(21) Appl. No.: 18/001,642

(22) PCT Filed: Jul. 8, 2021

(86) PCT No.: PCT/IB2021/056152
§ 371 (c)(1),
(2) Date: Dec. 13, 2022

(87) PCT Pub. No.: WO2022/029524
PCT Pub. Date: Feb. 10, 2022

(65) Prior Publication Data
US 2023/0239868 A1 Jul. 27, 2023

Related U.S. Application Data

(60) Provisional application No. 63/062,290, filed on Aug. 6, 2020.

(51) Int. Cl.
*H04W 72/1268* (2023.01)
*H04W 72/11* (2023.01)

(52) U.S. Cl.
CPC ........ *H04W 72/1268* (2013.01); *H04W 72/11* (2023.01)

(58) Field of Classification Search
CPC .......................... H04W 72/11; H04W 72/1268
See application file for complete search history.

(56) References Cited

U.S. PATENT DOCUMENTS

2017/0026942 A1* 1/2017 Vajapeyam ............. H04W 4/70
2018/0288746 A1* 10/2018 Zhang ................... H04W 72/23
(Continued)

FOREIGN PATENT DOCUMENTS

WO 2017/015528 A1 1/2017
WO 2021/064287 A1 4/2021

OTHER PUBLICATIONS

"Revised WID: Enhanced Industrial Internet of Things (IoT) and ultra-reliable and low latency communication (URLLC) support for NR", 3GPP TSG RAN Meeting #88e, RP-201310, Agenda: 9.10.5, Nokia, Jun. 29-Jul. 3, 2020, 6 pages.
(Continued)

*Primary Examiner* — Kenny S Lin
(74) *Attorney, Agent, or Firm* — Lippes Mathias LLP

(57) ABSTRACT

A method and apparatus may include determining, by a network entity, at least one interval of at least one scheduling resource during which the at least one scheduling resource is in at least one of a first status or a second status. The method may further include transmitting, by the network entity, information associated with the at least one interval of at least one scheduling resource to at least one user equipment. The at least one interval may occur periodically, and the at least one of scheduling resource may include at least one of configured grant for uplink or semi-persistent scheduling resource for downlink.

15 Claims, 11 Drawing Sheets

(56) References Cited

U.S. PATENT DOCUMENTS

| | | | |
|---|---|---|---|
| 2019/0320437 A1 | 10/2019 | Gupta et al. | |
| 2019/0342788 A1* | 11/2019 | Feuersaenger | H04W 72/1268 |
| 2019/0380141 A1 | 12/2019 | Gupta et al. | |
| 2020/0245395 A1* | 7/2020 | Zhang | H04W 76/19 |
| 2020/0288478 A1* | 9/2020 | Lee | H04W 72/53 |
| 2021/0044391 A1* | 2/2021 | Lunttila | H04W 28/04 |
| 2021/0314925 A1* | 10/2021 | Shin | H04L 5/0053 |

OTHER PUBLICATIONS

"Survival time triggered PDCP duplication", 3GPP TSG-RAN WG2 Meeting #105bis, R2-1903142, Agenda: 11.7.4, CATT, Apr. 8-12, 2019, pp. 1-3.

"Details of Selective Duplication Procedure", 3GPP TSG-RAN WG2 Meeting #105bis, R2-1904135, Agenda: 11.7.4, Lenovo, Apr. 8-12, 2019, pp. 1-3.

"Solutions to mitigate the periodicity misalignment between TSC traffic and CG/SPS", 3GPP TSG-RAN WG2 Meeting 106, R2-1907233, Agenda: 11.7.2.2, Huawei, May 13-17, 2019, 5 pages.

"New WID on enhanced Industrial Internet of Things (IoT) and URLLC support", 3GPP TSG RAN Meeting #86, RP-193233, Agenda: 9.1.2, Nokia, Dec. 9-12, 2019, 5 pages.

International Search Report and Written Opinion received for corresponding Patent Cooperation Treaty Application No. PCT/IB2021/056152, dated Oct. 21, 2021, 14 pages.

* cited by examiner

DUTY-CYCLE BASED CONFIGURED SCHEDULING

RELATED APPLICATION

This application claims priority to PCT Application No. PCT/IB2021/056152, filed on Jul. 8, 2021, which claims priority to U.S. Application No. 63/062,290, filed on Aug. 6, 2020, each of which is incorporated herein by reference in its entirety.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for duty-cycle based configured grant/semi-persistent scheduling.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some embodiments, a method may include determining, by a network entity, at least one interval of at least one scheduling resource during which the at least one scheduling resource is in at least one of a first status or a second status. The method may further include transmitting, by the network entity, information associated with the at least one interval of at least one scheduling resource to at least one user equipment. The at least one interval may occur periodically, and the at least one of scheduling resource may include at least one configured grant for uplink or semi-persistent scheduling resource for downlink.

In accordance with certain embodiments, an apparatus may include means for determining at least one interval of at least one scheduling resource during which the at least one scheduling resource is in at least one of a first status or a second status. The apparatus may further include means for transmitting information associated with the at least one interval of at least one scheduling resource to at least one user equipment. The at least one interval may occur periodically, and the at least one of scheduling resource may include at least one configured grant for uplink or semi-persistent scheduling resource for downlink.

In accordance with various embodiments, an apparatus may include at least one processor and at least one memory including computer program code. The at least one memory and the computer program code may be configured to, with the at least one processor, cause the apparatus to at least determine at least one interval of at least one scheduling resource during which the at least one scheduling resource is in at least one of a first status or a second status. The at least one memory and the computer program code may be further configured to, with the at least one processor, cause the apparatus to at least transmit information associated with the at least one interval of at least one scheduling resource to at least one user equipment. The at least one interval may occur periodically, and the at least one of scheduling resource may include at least one configured grant for uplink or semi-persistent scheduling resource for downlink.

In accordance with some embodiments, a non-transitory computer readable medium may be encoded with instructions that may, when executed in hardware, perform a method. The method may include determining at least one interval of at least one scheduling resource during which the at least one scheduling resource is in at least one of a first status or a second status. The method may further include transmitting information associated with the at least one interval of at least one scheduling resource to at least one user equipment. The at least one interval may occur periodically, and the at least one of scheduling resource may include at least one configured grant for uplink or semi-persistent scheduling resource for downlink.

In accordance with certain embodiments, a computer program product may perform a method. The method may include determining at least one interval of at least one scheduling resource during which the at least one scheduling resource is in at least one of a first status or a second status. The method may further include transmitting information associated with the at least one interval of at least one scheduling resource to at least one user equipment. The at least one interval may occur periodically, and the at least one of scheduling resource may include at least one configured grant for uplink or semi-persistent scheduling resource for downlink.

In accordance with various embodiments, an apparatus may include circuitry configured to determine at least one interval of at least one scheduling resource during which the at least one scheduling resource is in at least one of a first status or a second status. The circuitry may further be configured to transmit information associated with the at least one interval of at least one scheduling resource to at least one user equipment. The at least one interval may occur periodically, and the at least one of scheduling resource may include at least one configured grant for uplink or semi-persistent scheduling resource for downlink.

In accordance with some embodiments, a method may include receiving, by a user equipment, information associated with the at least one interval of at least one scheduling resource from at least one network entity. The method may further include communicating, by the user equipment, with the at least one network entity via activated scheduling resource of the at least one scheduling resource based on the information. The at least one scheduling resource is in at least one of a first or a second status, and comprises at least one of configured grant for uplink or semi-persistent scheduling resource for downlink.

In accordance with certain embodiments, an apparatus may include means for receiving information associated with the at least one interval of at least one scheduling resource from at least one network entity. The apparatus may further include means for communicating with the at least one network entity via activated scheduling resource of the at least one scheduling resource based on the information. The at least one scheduling resource is in at least one of a first or a second status, and comprises at least one of configured grant for uplink or semi-persistent scheduling resource for downlink.

In accordance with various embodiments, an apparatus may include at least one processor and at least one memory including computer program code. The at least one memory and the computer program code may be configured to, with the at least one processor, cause the apparatus to at least receive information associated with the at least one interval of at least one scheduling resource from at least one network entity. The at least one memory and the computer program code may be further configured to, with the at least one processor, cause the apparatus to at least communicate with the at least one network entity via activated scheduling resource of the at least one scheduling resource based on the information. The at least one scheduling resource is in at least one of a first or a second status, and comprises at least one of configured grant for uplink or semi-persistent scheduling resource for downlink.

In accordance with some embodiments, a non-transitory computer readable medium may be encoded with instructions that may, when executed in hardware, perform a method. The method may include receiving information associated with the at least one interval of at least one scheduling resource from at least one network entity. The method may further include communicating with the at least one network entity via activated scheduling resource of the at least one scheduling resource based on the information. The at least one scheduling resource is in at least one of a first or a second status, and comprises at least one of configured grant for uplink or semi-persistent scheduling resource for downlink.

In accordance with certain embodiments, a computer program product may perform a method. The method may include receiving information associated with the at least one interval of at least one scheduling resource from at least one network entity. The method may further include communicating with the at least one network entity via activated scheduling resource of the at least one scheduling resource based on the information. The at least one scheduling resource is in at least one of a first or a second status, and comprises at least one of configured grant for uplink or semi-persistent scheduling resource for downlink.

In accordance with various embodiments, an apparatus may include circuitry configured to receive information associated with the at least one interval of at least one scheduling resource from at least one network entity. The circuitry may further be configured to communicate with the at least one network entity via activated scheduling resource of the at least one scheduling resource based on the information. The at least one scheduling resource is in at least one of a first or a second status, and comprises at least one of configured grant for uplink or semi-persistent scheduling resource for downlink.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for duty-cycle based configured grant/semi-persistent scheduling is not intended to limit the scope of certain embodiments, but is instead representative of selected example embodiments.

Industrial Internet of Things (IIoT) applications include data traffic which can be deterministic and periodic in nature, with traffic arriving periodically at the radio access network (RAN) at predetermined times. For example, in 3GPP Rel-16, a base station may receive information relating to traffic characteristics of time-sensitive communication (TSC) data streams from the core network in order to enable more efficient resource allocation. Specifically, time-sensitive communication assistance information (TSCAI) could provide the base station with burst arrival periodicity and burst size, allowing the base station to configure scheduling resources, such as configured grants for uplink and SPS for downlink, with periodicity and transport block sizes suitable to accommodate the traffic patterns.

Deterministic IIoT can include several factors. For example, burst spread describes the variation of burst arrival times for traffic caused by latency and/or delays ("jitter"). As a result, this may be the maximum variance that a burst may experience for its arrival, deviated from the expected burst arrival time. In another example, survival time may describe the time that an application which consumes a communication service may continue without an expected message. Survival time could be expressed as a period of time and/or maximum number of consecutive incorrectly received or lost messages when the traffic is cyclic.

As noted above, in periodic TSC traffic, base stations may use configured scheduling mechanisms, such as configured grant (CG) in uplink or semi-persistent scheduling (SPS) in downlink, providing timely radio resource allocation by matching their periodicity to their burst arrival periodicity. This may significantly reduce overhead since the base station does not need to allocate dynamic grants for each incoming burst, as well as latency reductions, particularly in uplink However, with burst spread, the burst arrival time may deviate from the expected timing, causing the burst to arrive later than the pre-allocated radio resource by configured scheduling and fail to timely transmit. This may negatively affect TSC services having stringent latency requirements.

Figure 1:
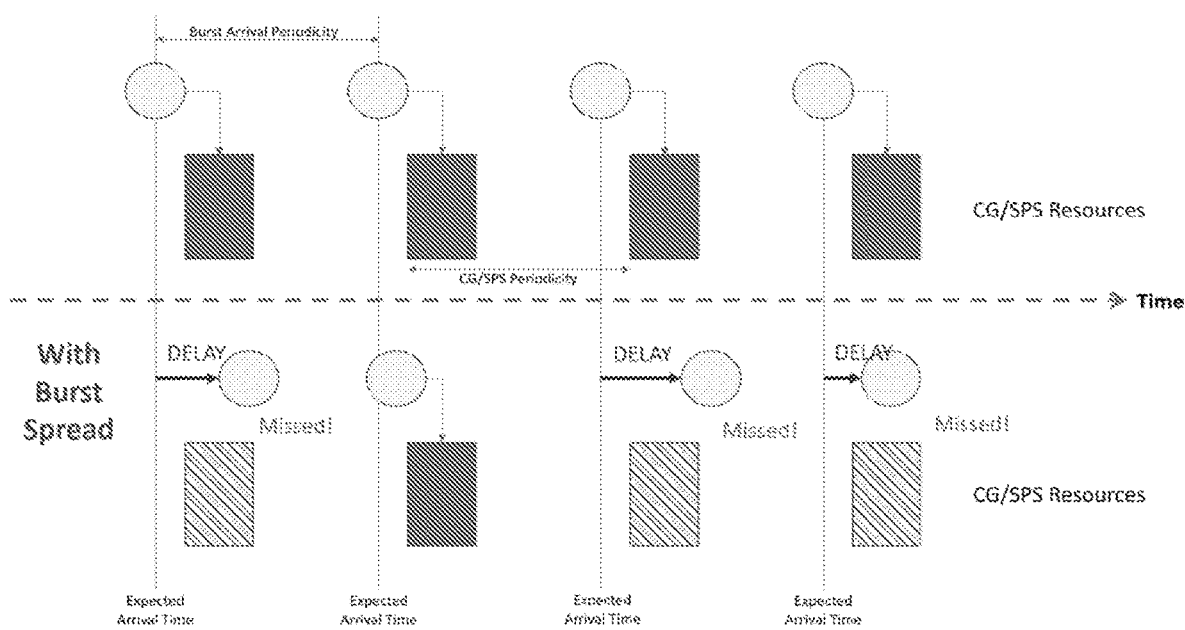
FIG. 1 illustrates various examples of burst spread.
Figure 2:
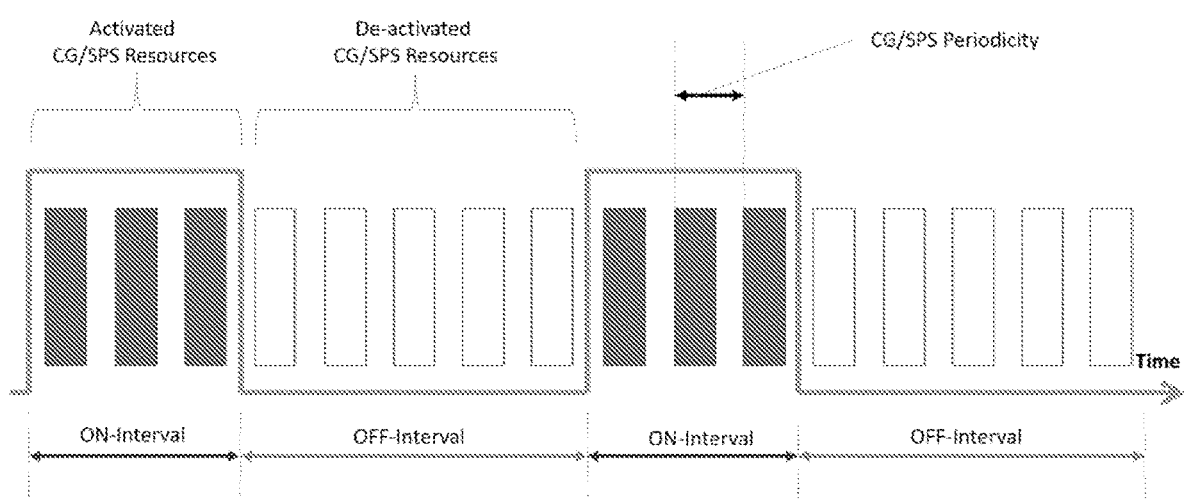
FIG. 2 illustrates an example of a resource configuration.
Figure 3:
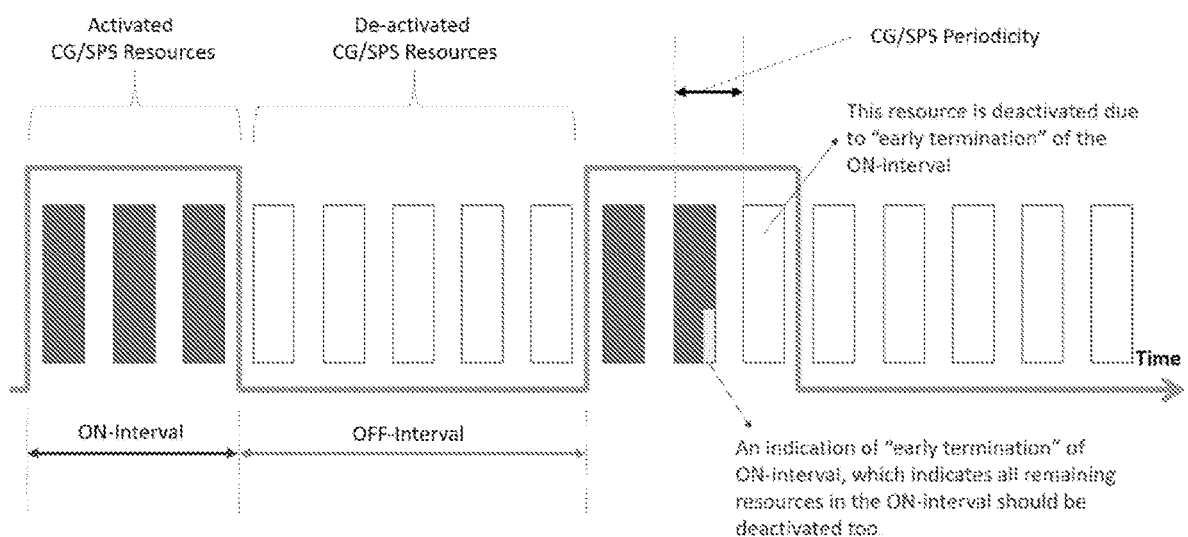
FIG. 3 illustrates an example of an indication of a next burst expected arrival time.

FIG. 1 illustrates an example of burst spread. Without burst spread, bursts can periodically arrive at the expected time, allowing pre-allocated CG/SPS resources to accommodate the incoming data in a timely manner. However, when burst spread occurs, the burst arrives with some timing deviation, and the late burst arrival may cause the pre-allocated CG/SPS resource to be missed. This may be addressed by the base station configuring the CG/SPS with a shorter periodicity, wherein the last burst would still be transmitted by the additional provisioned resources; however, this would be inefficient since many provisioned resources would go unutilized, wasting both radio and processing resources.

For CG, the user equipment would still transmit other information, such as MAC CEs, in these additional resources, ensuring that the base station would receive them even if the base station knows that the transmission opportunity is not used for data. And for SPS, the user equipment may continue to decode these PDSCH even though they are unused by the base station at all. Furthermore, the base station may configure multiple CG/SPS configurations, with time offset from each other, for one data stream to accommodate burst spread, but requiring the base station to resolve multiple HARQ processes for a single data stream since HARQ processes may not be shared among different CG configurations. This may limit the base station's ability to schedule with HARQ process limitations. Finally, the base station may also assign dynamic resource allocations and/or have CG/SPS resources at the latest possible arrival time of each burst, requiring the base station to assume that every burst arrives late, and requiring significant control signalling overhead for resource assignment. Where bursts arrive earlier than the expected arrival time, the RAN may fail to fulfill the packet delay budget (PDB) with this approach.

While burst spread issues may technically be resolved via implementation, the techniques described above may be inefficient and undesirable for networks by limiting their resource allocation flexibility. Thus, a flexible and efficient method for handling traffic with burst spread and survival time is desirable, which may minimize specification impacts and enable a RAN to satisfy TSC requirements in IIoT-use cases.

Certain embodiments described herein may have various benefits and/or advantages to overcome the disadvantages described above. For example, certain embodiments may enable the RAN to handle traffic with burst spread more efficiently, as well as be configured in conjunction with multiple CG/SPS to handle survival time. Furthermore, some embodiments may only require some new radio resource control (RRC) configuration parameters along with the related new UE behavior. Thus, certain embodiments discussed below are directed to improvements in computer-related technology.

Figure 4:
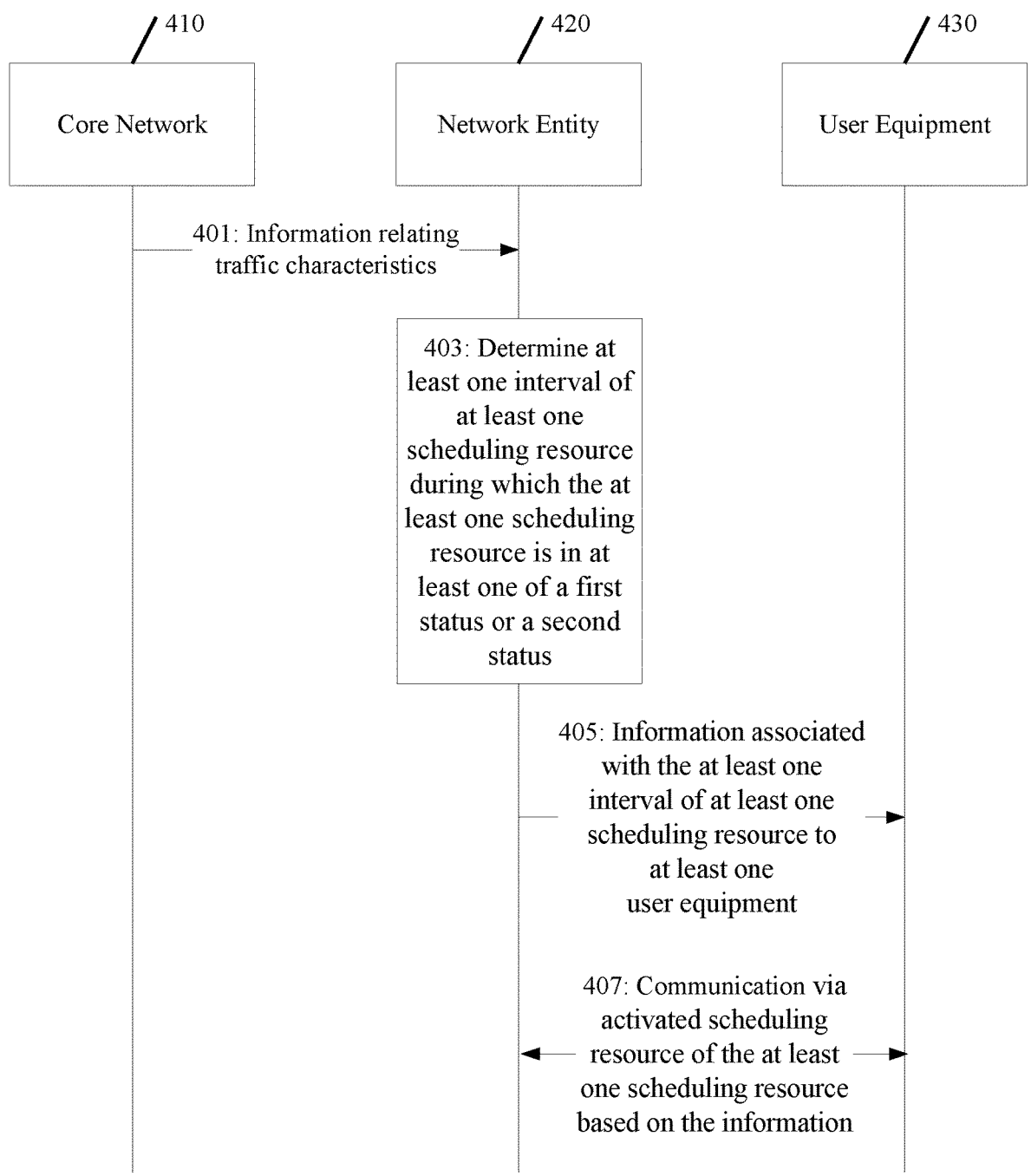
FIG. 4 illustrates a signaling diagram according to certain embodiments.
Figure 10:
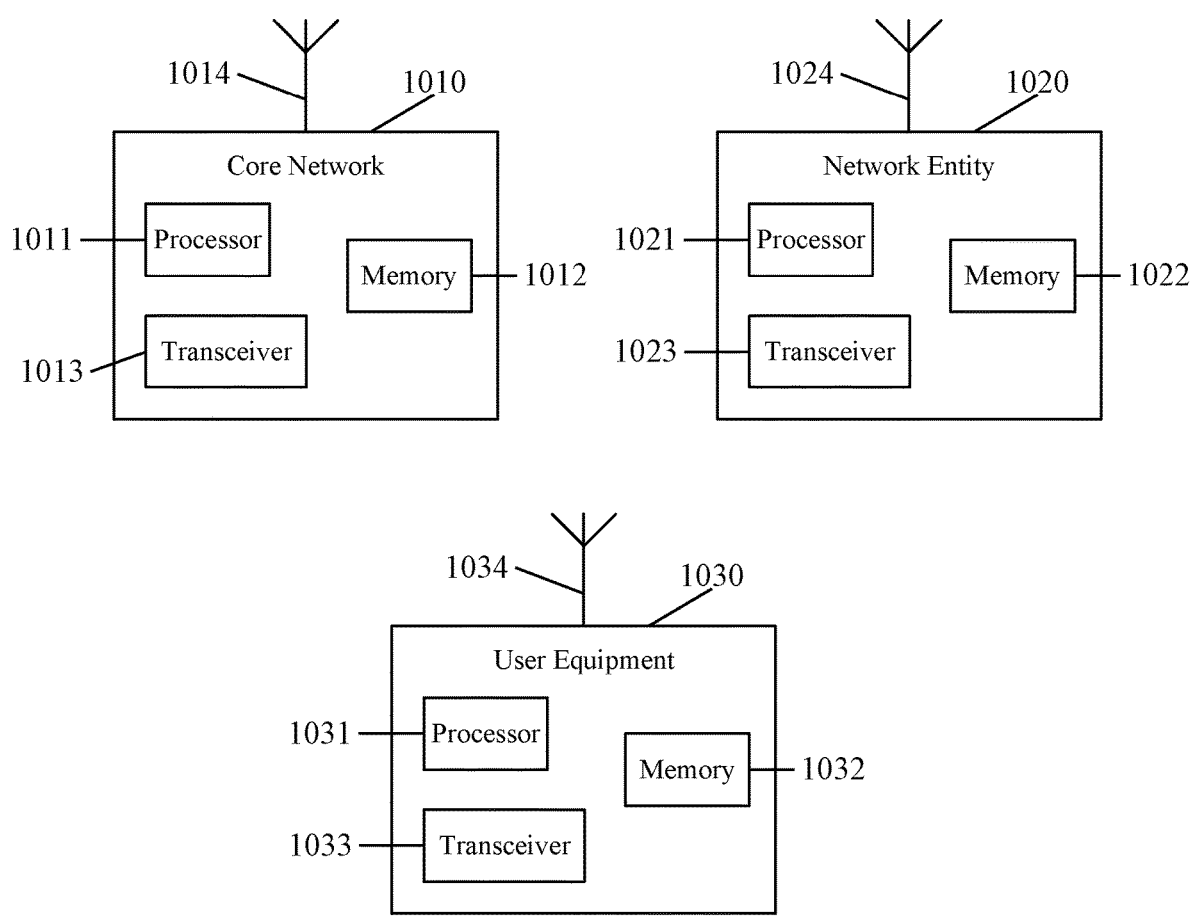
FIG. 10 illustrates an example of various network devices according to certain embodiments.

FIG. 4 illustrates an example of a signaling diagram depicting how to perform duty-cycle based configured grant/semi-persistent scheduling. Core network (CN) 410, user equipment (UE) 420, and network entity (NE) 430 may be similar to CN 1010, UE 1020, and NE 10320, respectively, as illustrated in FIG. 10, according to certain embodiments. At 401, CN 410 may transmit to NE 420 information relating to at least one traffic characteristic. The information may include characteristics of the targeted traffic stream, such as burst spread, survival time, and burst arrival periodicity.

At 403, NE 420 may determine at least one interval of at least one scheduling resource during which the at least one scheduling resource is in at least one of a first status or a second status, which may be based upon the information received from CN 410. The at least one interval may occur periodically, and/or may be associated with ON/OFF intervals in a variety of way. For example, with timer values, a CG/SPS configuration may be associated with an active timer and/or an inactive timer. Such timers may indicate when UE 430 should first start an active timer, start an inactive timer upon expiration of the active timer, and start the active timer again when the inactive timer expires.

In various embodiments, the first status may be activated, and the second status may be deactivated. The first status may be associated with a first set of transmission parameters, and the second status may be associated with a second set of transmission parameters. Furthermore, the at least one interval may also include at least one activated resource associated with the at least one configured grant, at least one semi-persistent scheduling resource and/or at least one inactivated resource associated with the at least one configured grant or at least one semi-persistent scheduling resource. In addition, a periodicity of the at least one interval of the at least one scheduling resource may be based on, or even equal to, at least one burst periodicity, and a periodicity of the at least one configured grant may be less than the at least one burst periodicity. At least one expected burst arrival time may also fall in the at least one interval. In addition, the at least one interval may be extended when transmission of the burst needs more resources.

In some embodiments, the CG/SPS configurations may include an ON-interval when the active timer is running, and an OFF interval when the inactive timer is running. The initial starting time of the timer may be associated to other parameters in the CG/SPS configuration, such as TimeDomainOffset, and/or characteristics of traffic to be served, such as expected burst arrival time.

In addition, timers may be stopped and started based on early termination or late termination indications, and/or timer values may be adjusted. In various embodiments, CG/SPS configurations may include at least one duty cycle periodicity, which may be the sum between an ON-interval and an OFF-interval. Furthermore, CG/SPS configurations may include information relating to the portion of either ON or OFF intervals within this cycle. In certain embodiments, CG/SPS configurations may include information relating to how many consecutive CG/SPS occasions are in ON and OFF intervals, respectively.

Figure 5A:
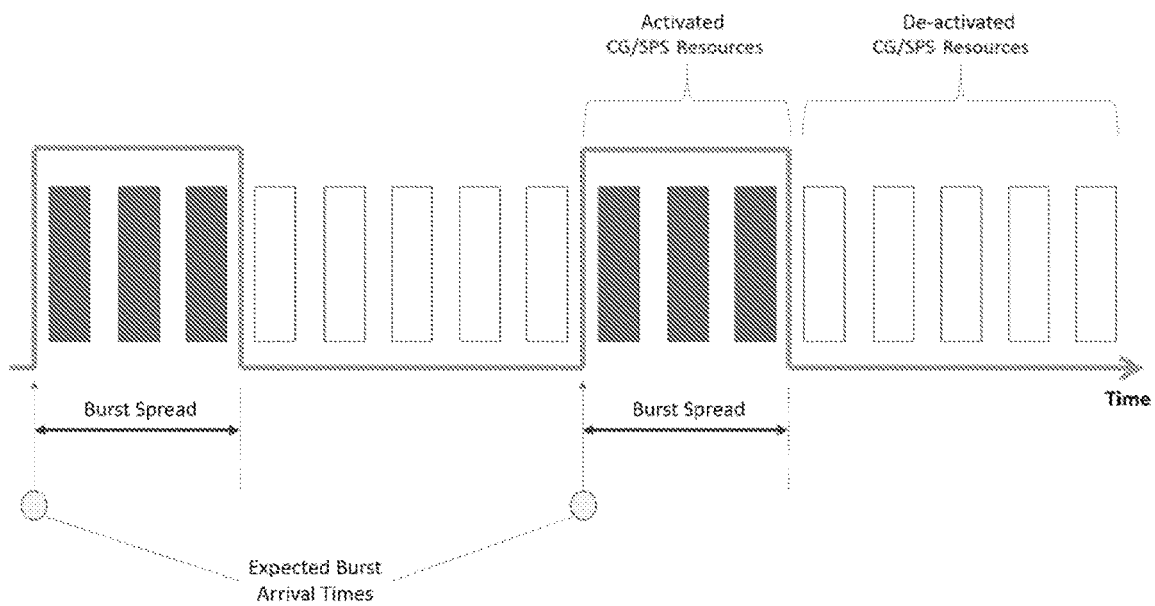
FIG. 5A illustrates an example of duty-cycle based configured grant/semi-persistent scheduling to burst spread handling according to some embodiments.
Figure 5B:
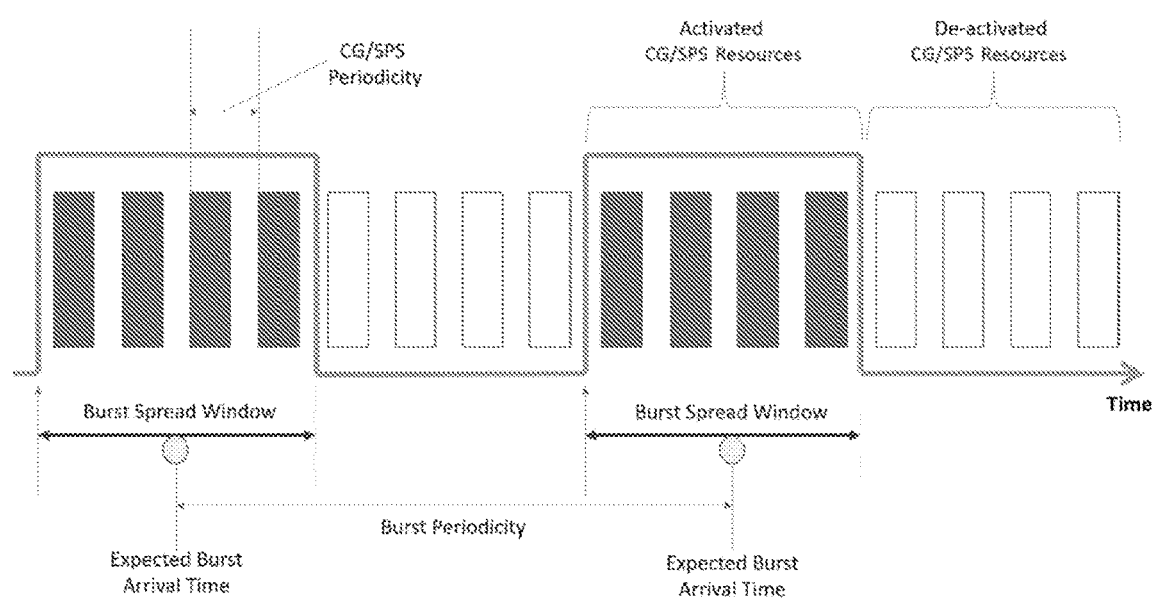
FIG. 5B illustrates another example of duty-cycle based configured grant/semi-persistent scheduling to burst spread handling according to certain embodiments.

In some embodiments, the CG/SPS configurations may match the ON-interval starting time with the expected burst arrival time, and match the ON-interval length with the burst spread of the traffic. FIG. 5A illustrates an example of duty-cycle based CG/SPS to burst spread handling, while FIG. 5B illustrates an example implementation where an expected arrival time is in the middle of an ON-interval. In this way, bursts which arrive late or early may still be served by the resources within the ON-interval. NE 420 may configure UE 430 with a CG/SPS periodicity shorter than the burst periodicity, providing the burst ample transmission opportunities within the ON-interval to accommodate lateness of the burst with a fine granularity. Although the radio resources are over-provisioned due to shorter periodicity, these resources may be deactivated during the OFF-interval, avoiding wasted resources, and preventing NE 420 and UE 430 from decoding these resources.

In some embodiments, the ON-interval may be configured according to maximum delays of a burst arrival, such as burst spread, representing a worst case scenario. For example, the burst may be transmitted prior to the latest resource within the ON-interval if the arrival delay of the burst is not the worst case. Thus, resource efficiency may be improved by early termination of the ON-interval such that remaining subsequent resources in the default ON-interval are deactivated. In addition, the exact size of a burst may be unknown. The network may need to allocate resources according to a variety of parameters, such as maximum burst data volume (MBDV), which may result in unused resource if certain bursts are smaller in size by a predetermined threshold. In various embodiments, indications, such as medium access control element (MAC CE) and/or uplink control information (UCI), may be embedded in the last transmission of the corresponding burst, wherein both NE 420 and UE 430 may be aware that the remaining resources within the current ON-interval may be deactivated. Doing so may enable NE 420 to use unused resources, such as for dynamic scheduling, and no longer require UE 430 to attempt to decode any remaining allocations within that ON-interval.

Figure 6:
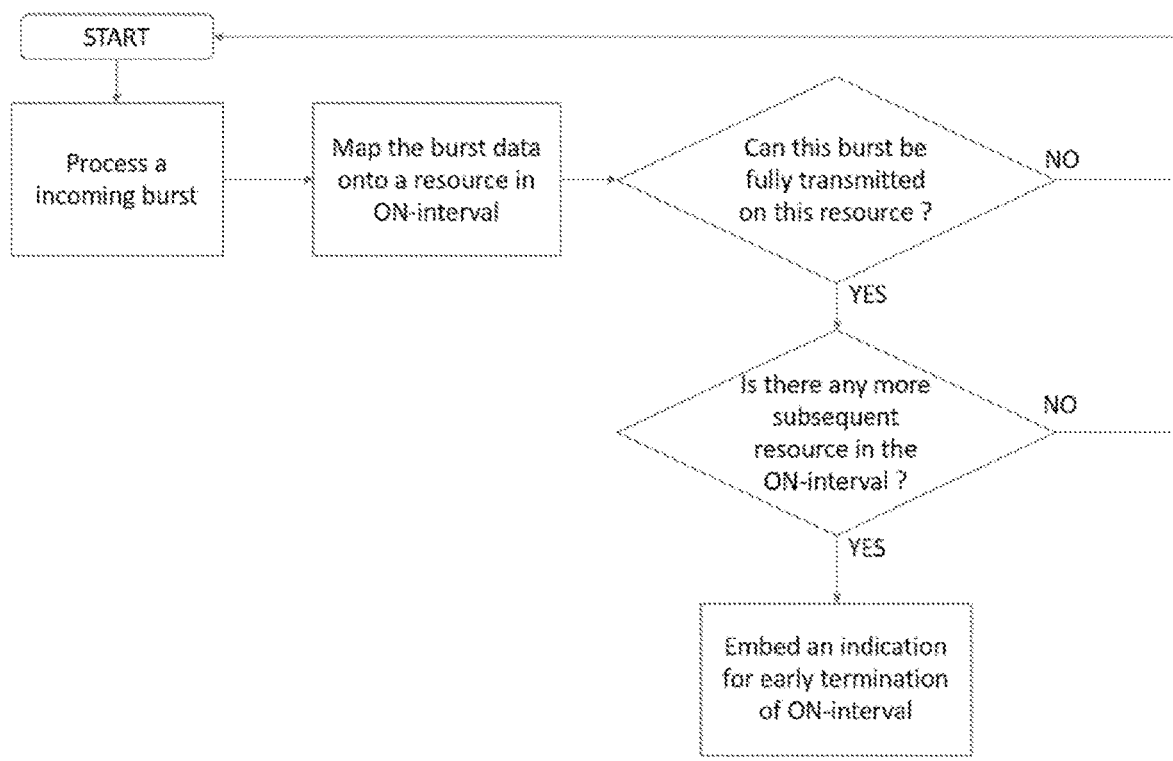
FIG. 6 illustrates an example of a process performed by a base station according to various embodiments.

In various embodiments, NE 420 may follow a procedure similar to that shown in FIG. 6 to determine whether NE 420 should include the aforementioned indications in the last transmission of the burst to trigger early termination the ON-interval and/or deactivate the remaining subsequent resources in the ON-interval accordingly. For example, once NE 420 begins processing an incoming burst, NE 420 may map burst data onto a resource in an ON-interval. If the burst can be fully transmitted on the resource, and if there are still subsequent resources in the ON-interval after the burst is fully transmitted, NE 420 may embed an indication for early termination of ON-interval.

In contrast, early termination of the ON-interval may be conditionally triggered. For example, early termination of the ON-interval may be conditioned on how many resources have been used in the present ON-interval. NE 420 may configure a parameter indicating a maximum number of resources to be used per ON-interval, and upon this maximum number being reached, any remaining subsequent resources within this ON-interval may be discarded. In various embodiments, where NE 420 requires more resources after reaching the maximum number of used resources within the ON-interval, NE 420 may further request to use more resources from any remaining subsequent resources in the ON-interval and/or subsequent resources in the OFF-interval deactivated by default, thereby triggering a late termination of the ON-interval. The request may be an explicit or implicit indication embedded in one of the transmission, in a MAC CE, and/or a physical layer indication such as downlink control information (DCI)/UCI.

Figure 7:
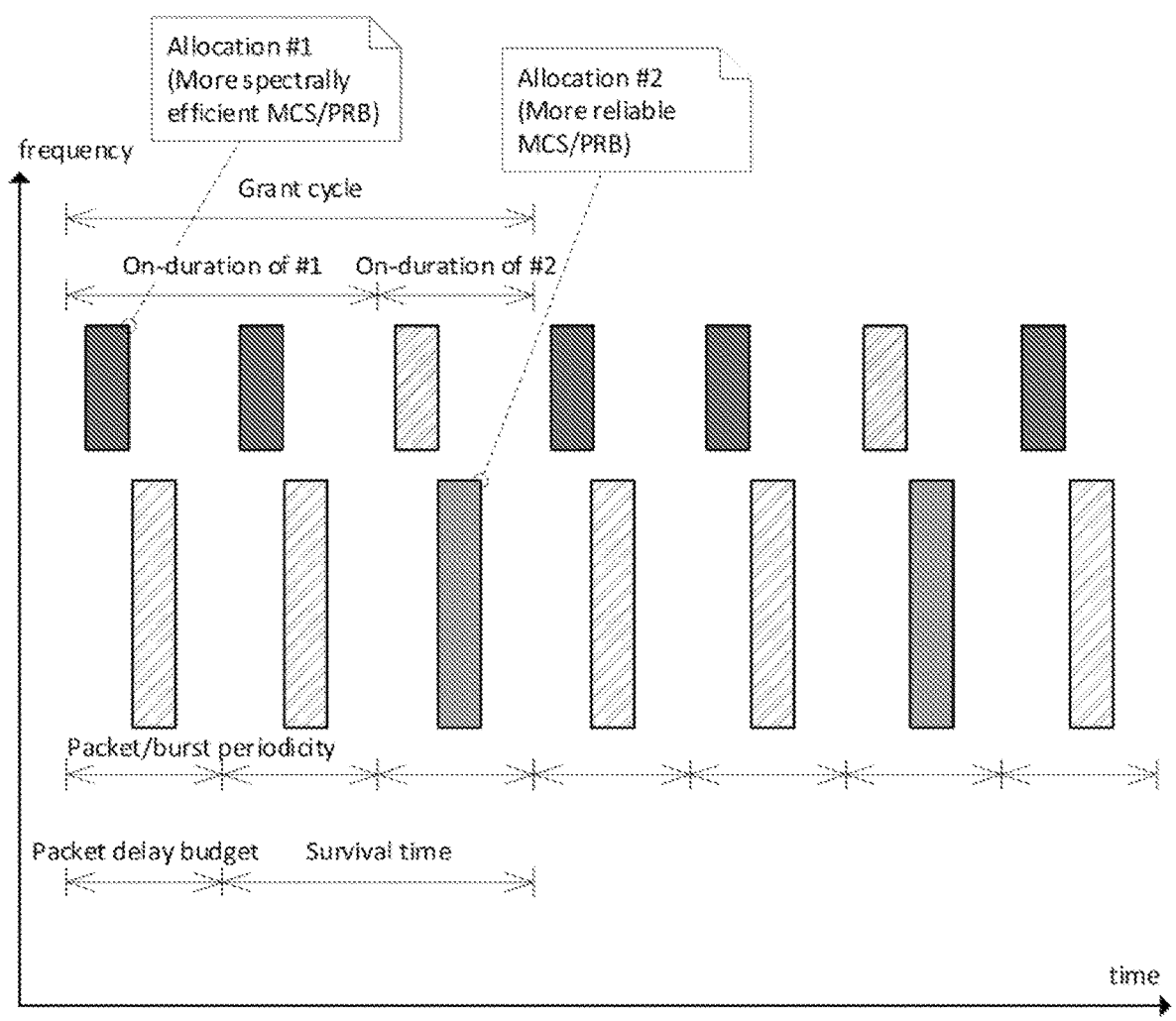
FIG. 7 illustrates an example of a survival time handling scheme based on the proposed duty-cycle based configured grant according to certain embodiments.

In addition to or alternatively from the embodiments explained above, duty-cycle based CG/SPS may be configured according to survival time in certain embodiments. FIG. 5A illustrates an example of a survival time handling scheme based on duty-cycle based CG, where such survival time-based applications may operate in conjunction with multiple CG/SPS configurations to prevent survival time violations while also maintain spectral efficiency. Similarly, FIG. 5B illustrates an example implementation where an expected arrival time is in the middle of an ON-interval. As an example, NE 420 may transmit every $N^{th}$ burst with higher reliability to reduce the probability of N consecutive burst errors. To accomplish this, NE 420 may configure UE 430 with a plurality of CGs with different reliability targets, such as where a first CG has a lower MCS than a second CG. NE 420 may then configure the plurality of CGs as "allowed grants" for an logical channel (LCH) corresponding to traffic with the survival requirement. Finally, NE 420 may configure UE 430 with ON/OFF intervals associated with the plurality of CGs such that their ON/OFF intervals are interlaced, wherein the ON-interval of a first CG matches the OFF-interval of a second CG, while the OFF-interval of the first CG matches the OFF-interval of second CG. As a result, UE 430 may be configured to use the CG having the highest reliability target for every $N^{th}$ burst from the LCH to ensure that every $N^{th}$ burst is transmitted more reliability to reduce the change of survival time violation. It is noted that may also prevent UE 430 from continuing to use resources with lower reliability even for each $N^{th}$ since UE 430 selecting resources overlapping in time would be an implementation issue, as illustrated in FIG. 7.

At 405, NE 420 may transmit to UE 430 information associated with the at least one interval of at least one scheduling resource to at least one user equipment. In some embodiments, the at least one scheduling resource may include at least one CG for uplink or at least one SPS resource for downlink. Furthermore, the information may be associated with one or more of an active timer associated with the at least one activated scheduling resource or an inactive timer associated with the at least one deactivated scheduling resource, and configured to cause UE 430 to start the active timer, start the inactive timer upon expiration of the active timer, and/or restart the active timer upon expiration of the inactive timer. The information may further include at least one duty cycle periodicity.

In addition, NE 420 may transmit information indicating at least one of one or more consecutive CG/SPS occasions associated with the first status, such as at least one activated resource of the at least one of configured grant for uplink or semi-persistent scheduling resource for downlink, or one or more consecutive CG/SPS occasions associated with the second status, such as at least one inactivated resource of the at least one of configured grant for uplink or semi-persistent scheduling resource for downlink. In addition, NE 420 may transmit data on the SPS resource for downlink and/or receive data on the CG for uplink during the at least one interval of scheduling resource.

At 407, NE 420 and UE 430 may communicate via activated scheduling resource of the at least one scheduling resource based on the information. In addition, NE 420 may deactivate at least one remaining subsequent resource on the at least one interval where at least one burst is completely transmitted during the interval and before an ending point of the interval. For example, the deactivating may be triggered based upon at least one MAC CE or UCI indication multiplexed in physical uplink shared channel (PUSCH), and NE 420 may further confirm the deactivating with at least one signal to UE 430.

Figure 8:
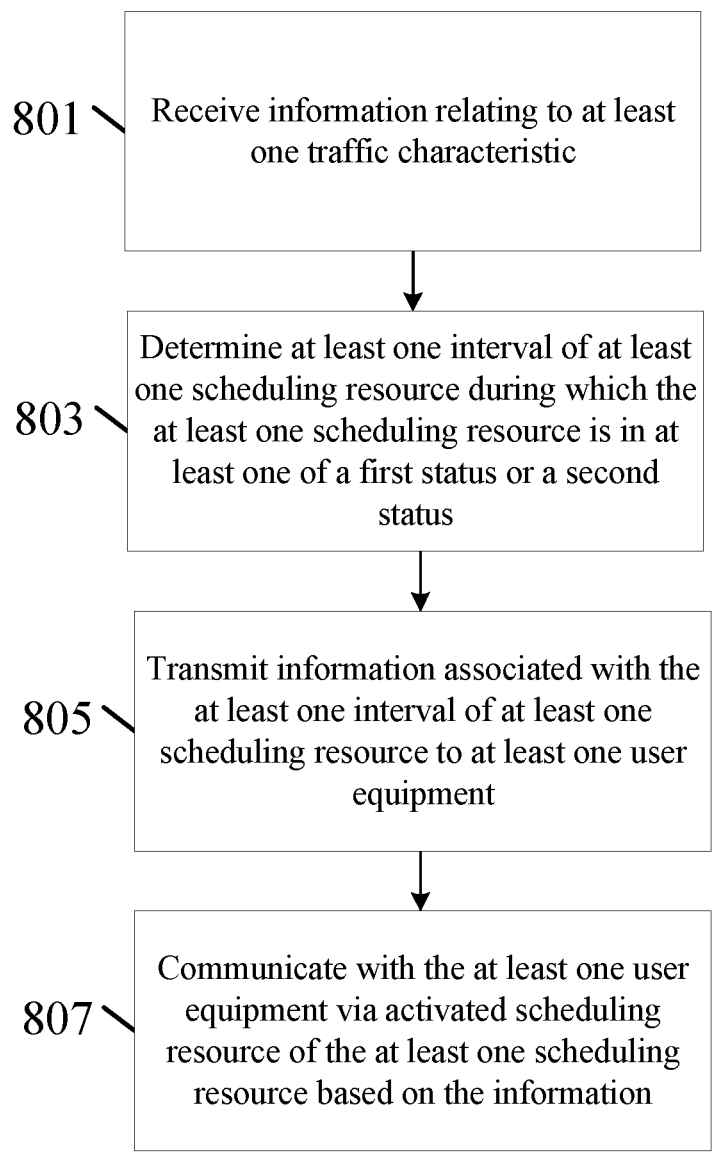
FIG. 8 illustrates an example of a flow diagram of a method according to some embodiments.

FIG. 8 illustrates an example of a flow diagram of a method that may be performed by a NE, such as NE 1020 illustrated in FIG. 10, according to various embodiments. At 801, the NE may receive information relating to at least one traffic characteristic from a CN, such as CN 1010 illustrated in FIG. 10. The information may include characteristics of the targeted traffic stream, such as burst spread, survival time, and burst arrival periodicity.

At 803, the NE may determine at least one interval of at least one scheduling resource during which the at least one scheduling resource is in at least one of a first status or a second status, which may be based upon the information received from the CN. The at least one interval may occur periodically, and/or may be associated with ON/OFF intervals in a variety of way. For example, with timer values, a CG/SPS configuration may be associated with an active timer and/or an inactive timer. Such timers may indicate when the UE should first start an active timer, start an inactive timer upon expiration of the active timer, and start the active timer again when the inactive timer expires.

In various embodiments, the first status may be activated, and the second status may be deactivated. The first status may be associated with a first set of transmission parameters, and the second status may be associated with a second set of transmission parameters. Furthermore, the at least one interval may also include at least one activated resource associated with the at least one CG or at least one SPS resource and/or at least one inactivated resource associated with the at least one CG or at least one SPS resource. In addition, a periodicity of the at least one interval of the at least one scheduling resource may be based on, or even equal to, at least one burst periodicity, and a periodicity of the at least one configured grant may be less than the at least one burst periodicity. At least one expected burst arrival time may also fall in the at least one interval. In addition, the at least one interval may be extended when transmission of the burst needs more resources.

In some embodiments, the CG/SPS configurations may include an ON-interval when the active timer is running, and an OFF interval when the inactive timer is running. The initial starting time of the timer may be associated to other parameters in the CG/SPS configuration, such as TimeDomainOffset, and/or characteristics of traffic to be served, such as expected burst arrival time. In addition, timers may be stopped and started based on early termination or late termination indications, and/or timer values may be adjusted. In various embodiments, CG/SPS configurations may include at least one duty cycle periodicity, which may be the sum between an ON-interval and an OFF-interval. Furthermore, CG/SPS configurations may include information relating to the portion of either ON or OFF interval within this cycle. In certain embodiments, CG/SPS configurations may include information relating to how many consecutive CG/SPS occasions are in ON and OFF intervals, respectively.

In some embodiments, the CG/SPS configurations may match the ON-interval starting time with the expected burst arrival time, and match the ON-interval length with the burst spread of the traffic. FIG. 5A illustrates an example of duty-cycle based CG/SPS to burst spread handling. Similarly, FIG. 5B illustrates an example implementation where an expected arrival time is in the middle of an ON-interval. In this way, bursts which arrive late may still be served by the resources within the ON-interval. The NE may configure the UE with a CG/SPS periodicity shorter than the burst periodicity, providing the burst ample transmission opportunities within the ON-interval to accommodate lateness of the burst with a fine granularity. Although the radio resources are over-provisioned due to shorter periodicity, these resources may be deactivated during the OFF-interval, avoiding wasted resources, and preventing the NE and the UE from decoding these resources.

In some embodiments, the ON-interval may be configured according to maximum delays of a burst arrival, such as burst spread, representing a worst case scenario. For example, the burst may be transmitted prior to the latest resource within the ON-interval if the arrival delay of the burst is not the worst case. Thus, resource efficiency may be improved by early termination of the ON-interval such that remaining subsequent resources in the default ON-interval are deactivated. In addition, the exact size of a burst may be unknown. The network may need to allocate resources according to a variety of parameters, such as MBDV, which may result in unused resource if certain bursts are smaller in size by a predetermined threshold. In various embodiments, indications, such as MAC CE and/or UCI, may be embedded in the last transmission of the corresponding burst, wherein both the NE and the UE are aware that the remaining resources within the current ON-interval may be deactivated. Doing so may enable the NE to use unused resources, such as for dynamic scheduling, and no longer require the UE to attempt to decode any remaining allocations within that ON-interval.

In various embodiments, the NE may follow a procedure similar to that shown in FIG. 6 to determine whether the NE should include the aforementioned indications in the last transmission of the burst to trigger early termination the ON-interval and/or deactivate the remaining subsequent resources in the ON-interval accordingly. For example, once the NE begins processing an incoming burst, the NE may map burst data onto a resource in an ON-interval. If the burst can be fully transmitted on the resource, and if there are still subsequent resources in the ON-interval after the burst is fully transmitted, the NE may embed an indication for early termination of ON-interval.

In contrast, early termination of the ON-interval may be conditionally triggered. For example, early termination of the ON-interval may be conditioned on how many resources have been used in the present ON-interval. The NE may configure a parameter indicating a maximum number of resources to be used per ON-interval, and upon this maximum number being reached, any remaining subsequent resources within this ON-interval may be discarded. In various embodiments, where the NE requires more resources after reaching the maximum number of used resources within the ON-interval, the NE may further request to use more resources from any remaining subsequent resources in the ON-interval and/or subsequent resources in the OFF-interval deactivated by default, thereby triggering a late termination of the ON-interval. The request may be an explicit or implicit indication embedded in one of the transmission, in a MAC CE, and/or a physical layer indication such as DCI/UCI.

In addition to or alternatively from the embodiments explained above, duty-cycle based CG/SPS may be configured according to survival time in certain embodiments. FIG. 5A illustrates an example of a survival time handling scheme based on duty-cycle based CG, where such survival time-based applications may operate in conjunction with multiple CG/SPS configurations to prevent survival time violations while also maintain spectral efficiency. Similarly, FIG. 5B illustrates an example implementation where an expected arrival time is in the middle of an ON-interval. As an example, the NE may transmit every $N^{th}$ burst with higher reliability to reduce the probability of N consecutive burst errors. To accomplish this, the NE may configure the UE with a plurality of CGs with different reliability targets, such as where a first CG has a lower MCS than a second CG. The NE may then configure the plurality of CGs as "allowed grants" for an LCH corresponding to traffic with the survival requirement. Finally, the NE may configure the UE with ON/OFF intervals associated with the plurality of CGs such that their ON/OFF intervals are interlaced, wherein the ON-interval of a first CG matches the OFF-interval of a second CG, while the OFF-interval of the first CG matches the OFF-interval of second CG. As a result, the UE may be configured to use the CG having the highest reliability target for every $N^{th}$ burst from the LCH to ensure that every $N^{th}$ burst is transmitted more reliability to reduce the change of survival time violation. It is noted that may also prevent the UE from continuing to use resources with lower reliability even for each $N^{th}$ since the UE selecting resources overlapping in time would be an implementation issue, as illustrated in FIG. 7.

At 805, the NE may transmit to the UE information associated with the at least one interval of at least one scheduling resource to at least one user equipment. In some embodiments, the at least one scheduling resource may include at least one CG for uplink or at least one SPS resource for downlink. Furthermore, the information may be associated with one or more of an active timer associated with the at least one activated scheduling resource or an inactive timer associated with the at least one deactivated scheduling resource, and configured to cause the UE to start the active timer, start the inactive timer upon expiration of the active timer, and/or restart the active timer upon expiration of the inactive timer. The information may further include at least one duty cycle periodicity.

In addition, the NE may transmit information indicating at least one of one or more consecutive CG/SPS occasions associated with the first status, such as at least one activated resource of the at least one of configured grant for uplink, or semi-persistent scheduling resource for downlink or one or more consecutive CG/SPS occasions associated with the second status, such as at least one inactivated resource of the at least one of configured grant for uplink or semi-persistent scheduling resource for downlink. In addition, the NE may transmit data on the SPS resource for downlink and/or receive data on the CG for uplink during the at least one interval of scheduling resource.

At 807, the NE and the UE may communicate via activated scheduling resource of the at least one scheduling resource based on the information. In addition, the NE may deactivate at least one remaining subsequent resource on the at least one interval where at least one burst is completely transmitted during the interval and before an ending point of the interval. For example, the deactivating may be triggered based upon at least one medium access control element or uplink control information indication multiplexed in PUSCH, and the NE may further confirm the deactivating with at least one signal to the UE.

Figure 9:
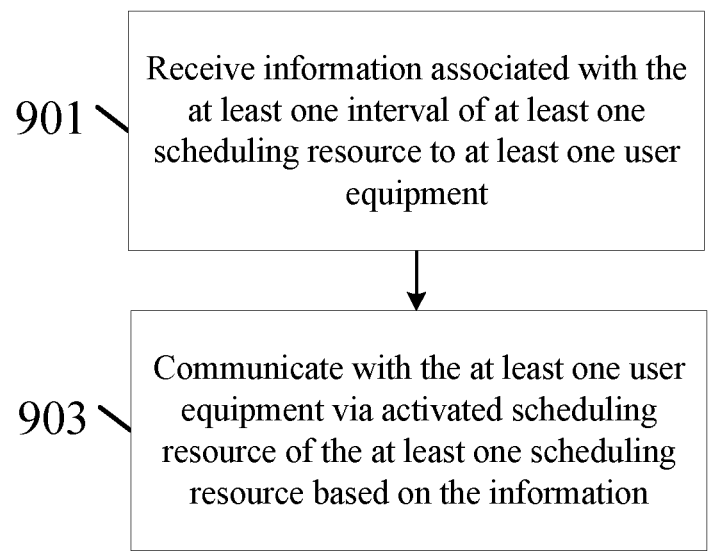
FIG. 9 illustrates another example of a flow diagram of a method according to various embodiments.

FIG. 9 illustrates an example of a flow diagram of a method that may be performed by a UE, such as UE 1030 illustrated in FIG. 10, according to various embodiments. At 901, the UE may receive information associated with at least one interval of at least one scheduling resource from a NE, such as NE 1020 in FIG. 10. In some embodiments, the at least one scheduling resource may include at least one CG for uplink or at least one SPS resource for downlink. Furthermore, the information may be associated with one or more of an active timer associated with the at least one activated scheduling resource or an inactive timer associated with the at least one deactivated scheduling resource, and configured to cause the UE to start the active timer, start the inactive timer upon expiration of the active timer, and/or restart the active timer upon expiration of the inactive timer. The information may further include at least one duty cycle periodicity.

In addition, the UE may receive information indicating at least one of one or more consecutive CG/SPS occasions associated with at least one activated resource of the at least one CG or at least one SPS resource or one or more consecutive CG/SPS occasions associated with at least one inactivated resource of the at least one CG or at least one SPS resource. In addition, the NE may transmit data on the SPS resource for downlink and/or receive data on the CG for uplink during the at least one interval of scheduling resource.

At 903, the NE and the UE may communicate via activated scheduling resource of the at least one scheduling resource based on the information. In addition, the NE may deactivate at least one remaining subsequent resource on the at least one interval where at least one burst is completely transmitted during the interval and before an ending point of the interval. For example, the deactivating may be triggered based upon at least one medium access control element or uplink control information indication multiplexed in PUSCH, and the NE may further confirm the deactivating with at least one signal to the UE.

FIG. 10 illustrates an example of a system according to certain example embodiments. In one example embodiment, a system may include multiple devices, such as, for example, CN 1010, NE 1020 and/or UE 1030.

CN 1010 may include the architecture illustrated in FIG. 11, discussed below. In addition, CN 1010 and/or NE 1020 may be one or more of a base station, such as an eNB or gNB, a serving gateway, a server, and/or any other access node or combination thereof. Furthermore, CN 1010 and/or NE 1020 may be one or more of a citizens broadband radio service device (CBSD).

CN 1010 and/or NE 1020 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 1030 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

CN 1010, NE 1020, and/or UE 1030 may include at least one processor, respectively indicated as 1011, 1021, and 1031. Processors 1011, 1021, and 1031 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1012, 1022, and 1032. The memory may be fixed or removable. The memory may include computer program instructions or computer code contained therein. Memories 1012, 1022, and 1032 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1011, 1021, and 1031, memories 1012, 1022, and 1032, and any subset thereof, may be configured to provide means corresponding to the various blocks of FIGS. 4-9. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 10 transceivers 1013, 1023, and/or 1033 may be provided, and one or more devices may also include at least one antenna, respectively illustrated as 1014, 1024, and/or 1034. The one or more devices may have many antennas, such as an array of antennas configured for multiple input multiple output (MIMO) communications, or multiple antennas for multiple RATs. Other configurations of these devices, for example, may be provided. Transceivers 1013, 1023, and 1033 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 4-9). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 4-9. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 11:
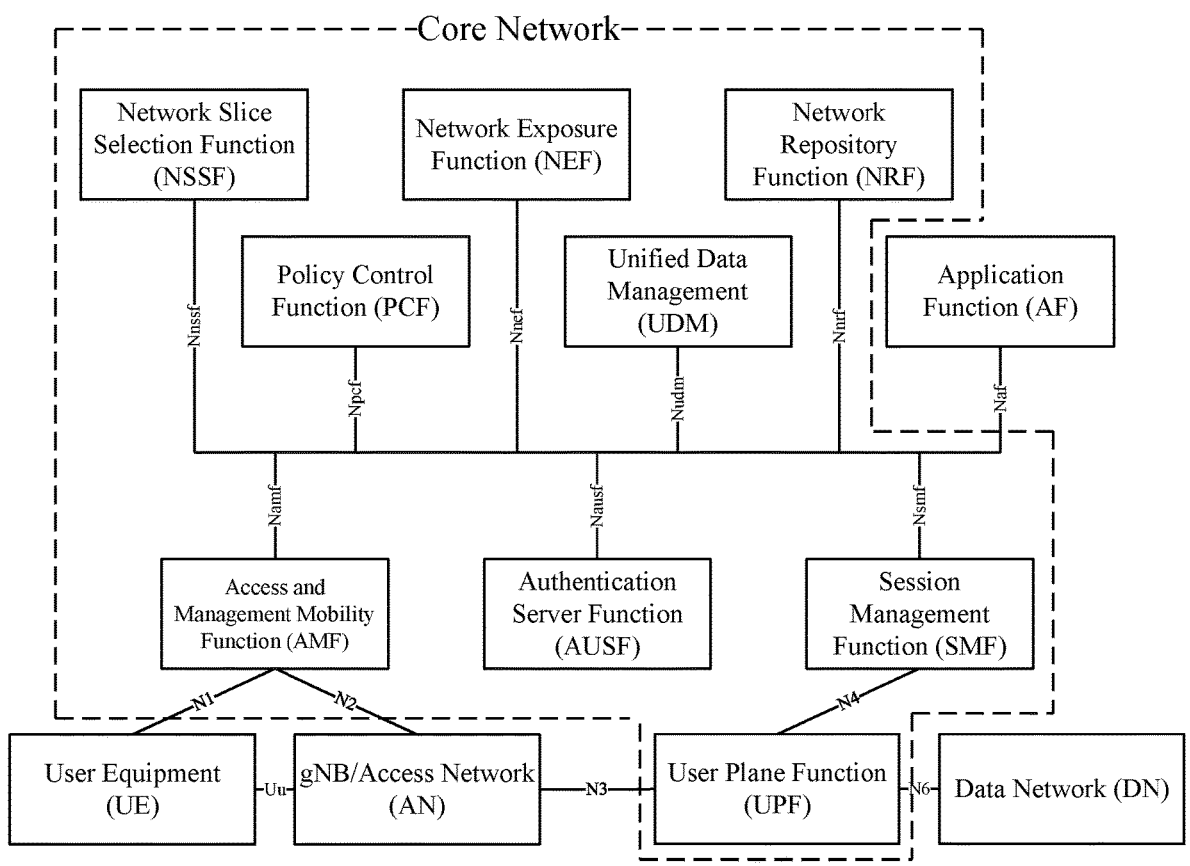
FIG. 11 illustrates an example of a 5G network and system architecture according to some embodiments.

FIG. 11 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 11 may be similar to NE 1020 and UE 1030, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP Third Generation Partnership Project
5G Fifth Generation
5GC Fifth Generation Core
5GS Fifth Generation System
AMF Access and Mobility Management Function
ARQ Automatic Repeat Request
ASIC Application Specific Integrated Circuit
BS Base Station
CBSD Citizens Broadband Radio Service Device
CE Control Element
CG Configured Grant
CN Core Network
CPU Central Processing Unit
DCI Downlink Control Information
DL Downlink
DMRS Demodulation Reference Signal
eMBB Enhanced Mobile Broadband
eMTC Enhanced Machine Type Communication
eNB Evolved Node B
eOLLA Enhanced Outer Loop Link Adaptation
EPS Evolved Packet System
gNB Next Generation Node B
GPS Global Positioning System
HARQ Hybrid Automatic Repeat Request HDD Hard Disk Drive
IEEE Institute of Electrical and Electronics Engineers
IIoT Industrial Internet of Things
IoT Internet of Things
IPTV Internet Protocol Television
LCH Logical Channel
LTE Long-Term Evolution
LTE-A Long-Term Evolution Advanced
MAC Medium Access Control
MBDV Maximum Burst Data Volume
MCS Modulation and Coding Scheme
MEMS Micro Electrical Mechanical System
MIB Master Information Block
MIMO Multiple Input Multiple Output
MME Mobility Management Entity
mMTC Massive Machine Type Communication
MPDCCH Machine Type Communication Physical Downlink Control Channel
MTC Machine Type Communication
NAS Non-Access Stratum
NE Network Entity
NG Next Generation
NG-eNB Next Generation Evolved Node B
NG-RAN Next Generation Radio Access Network
NR New Radio
NR-U New Radio Unlicensed
OFDM Orthogonal Frequency Division Multiplexing
OLLA Outer Loop Link Adaptation
PDB Packet Delay Budget
PDA Personal Digital Assistance
PDB Packet Delay Budget
PDCCH Physical Downlink Control Channel
PDSCH Physical Downlink Shared Channel
PHY Physical
PUSCH Physical Uplink Shared Channel
QoS Quality of Service
RAM Random Access Memory
RAN Radio Access Network
RAT Radio Access Technology
RE Resource Element
RLC Radio Link Control
RRC Radio Resource Control
RS Reference Signal
SMF Session Management Function
SPS Semi-Persistent Scheduling
SSB Synchronization Signal Block
TS Technical Specification
TSC Time Sensitive Communication
TSCAI Time Sensitive Communication Assistance Information
Tx Transmission
UCI Uplink Control Information
UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

We claim:

1. An apparatus, comprising:
at least one processor; and
at least one memory including computer program code, wherein the at least one memory and the computer program code are configured to, with the at least one processor, cause the apparatus at least to:
receive information associated with at least one interval of at least one scheduling resource from at least one network entity; and
communicate with the at least one network entity via activated scheduling resource of the at least one scheduling resource based on the information, wherein
the at least one interval occurs periodically, and
the at least one scheduling resource is in at least one of a first or a second status, and comprises a configured grant for uplink and a semi-persistent scheduling resource for downlink,
wherein the information is associated with an active timer associated with the at least one activated scheduling resource and an inactive timer associated with the at least one deactivated scheduling resource, and configured to cause the following:
start the active timer;
start the inactive timer upon expiration of the active timer; and
restart the active timer upon expiration of the inactive timer,
wherein the at least one interval comprises the following:
at least one activated resource associated with the configured grant for uplink and the semi-persistent scheduling resource for downlink; and
at least one inactivated resource associated with the configured grant for uplink and the semi-persistent scheduling resource for downlink,
wherein the at least one memory and the computer program code are configured to, with the at least one processor, cause the apparatus at least to:
receive data on the semi-persistent scheduling resource for downlink; and
transmit data on the configured grant for uplink during the at least one interval of scheduling resource.

2. The apparatus of claim 1, wherein the first status is activated, and the second status is deactivated.

3. The apparatus of claim 2, wherein the configured grant and semi-persistent scheduling configurations include an ON-interval when the active timer is running, and an OFF interval when the inactive timer is running, wherein the initial starting time of the timer is associated to other parameters in the configured grant and semi-persistent scheduling configurations, the parameters including Time-DomainOffset, and characteristics of traffic to be served,
wherein timers are stopped and started based on early termination or late termination indications and timer values are adjusted,
wherein configured grant and semi-persistent scheduling configurations include at least one duty cycle periodicity, which is the sum between an ON-interval and an OFF-interval, information relating to the portion of either ON or OFF intervals within this cycle, and information relating to how many consecutive configured grant and semi-persistent scheduling occasions are in ON and OFF intervals, respectively.

4. The apparatus of claim 3, wherein the first status is associated with a first set of transmission parameters, and the second status is associated with a second set of transmission parameters, and the configured grant and semi-persistent scheduling configurations match the ON-interval starting time with an expected burst arrival time, and match the ON-interval length with a burst spread of the traffic.

5. The apparatus of claim 1, wherein the at least one information comprises at least one duty cycle periodicity.

6. The apparatus of claim 1, wherein a periodicity of the at least one interval of the at least one scheduling resource is based on at least one burst periodicity, and a periodicity of the at least one of configured grant for uplink or semi-persistent scheduling resource for downlink is less than the at least one burst periodicity.

7. The apparatus of claim 1, wherein the at least one memory and the computer program code are configured to, with the at least one processor, cause the apparatus at least to:
receive information indicating at least one of one or more consecutive configured grant or semi-persistent scheduling occasions associated with the first status, or semi-persistent scheduling occasions associated with the second status.

8. The apparatus of claim 1, wherein at least one expected burst arrival time falls in the at least one interval.

9. The apparatus of claim 1, wherein the at least one interval is extended when transmission of the burst needs more resources.

10. A method, comprising:
receiving, by a user equipment, information associated with at least one interval of at least one scheduling resource from at least one network entity; and
communicating, by the user equipment, with the at least one network entity via activated scheduling resource of the at least one scheduling resource based on the information, wherein the at least one interval occurs periodically, and
the at least one scheduling resource is in at least one of a first or a second status, and comprises a configured grant for uplink and a semi-persistent scheduling resource for downlink,
wherein the information is associated with an active timer associated with the at least one activated scheduling resource and an inactive timer associated with the at least one deactivated scheduling resource, and the method further comprises:
starting the active timer;
starting the inactive timer upon expiration of the active timer; and
restarting the active timer upon expiration of the inactive timer,
wherein the at least one interval comprises the following:
at least one activated resource associated with the configured grant for uplink and the semi-persistent scheduling resource for downlink; and
at least one inactivated resource associated with the configured grant for uplink and the semi-persistent scheduling resource for downlink,
wherein the method further comprises:
receiving data on the semi-persistent scheduling resource for downlink; and
transmitting data on the configured grant for uplink during the at least one interval of scheduling resource.

11. An apparatus, comprising:
at least one processor; and
at least one memory including computer program code,
wherein the at least one memory and the computer program code are configured to, with the at least one processor, cause the apparatus at least to:
determine at least one interval of at least one scheduling resource during which the at least one scheduling resource is in at least one of a first status or a second status; and
transmit information associated with the at least one interval of at least one scheduling resource to at least one user equipment, wherein
the at least one interval occurs periodically, and
the at least one scheduling resource comprises a configured grant for uplink and a semi-persistent scheduling resource for downlink,
wherein the at least one memory and the computer program code are configured to, with the at least one processor, cause the apparatus at least to:
communicate with the at least one user equipment via activated scheduling resource of the at least one scheduling resource based on the information,
wherein the information is associated with: an active timer associated with the at least one activated scheduling resource, and an inactive timer associated with the at least one deactivated scheduling resource, and configured to cause, at the at least one user equipment:
start the active timer;
start the inactive timer upon expiration of the active timer; and
restart the active timer upon expiration of the inactive timer,
wherein the at least one interval comprises: at least one activated resource associated with the at configured grant for uplink and the semi-persistent scheduling resource for downlink; and
at least one inactivated resource associated with the configured grant for uplink and the semi-persistent scheduling resource for downlink.

12. The apparatus of claim 11, wherein the first status is activated, and the second status is deactivated.

13. The apparatus of claim 11, wherein the first status is associated with a first set of transmission parameters, and the second status is associated with a second set of transmission parameters.

14. The apparatus of claim 11, wherein the at least one information comprises at least one duty cycle periodicity.

15. The apparatus of claim 11, wherein a periodicity of the at least one interval of the at least one scheduling resource is based on at least one burst periodicity, and a periodicity of the at least one of configured grant for uplink or semi-persistent scheduling resource for downlink is less than the at least one burst periodicity.

* * * * *